(12) United States Patent
Toqan et al.

(10) Patent No.: US 10,489,577 B2
(45) Date of Patent: Nov. 26, 2019

(54) IDENTIFYING ONE OR MORE USERS BASED ON TYPING PATTERN AND/OR BEHAVIOR

(71) Applicant: Onenigma LLC, Chicago, IL (US)

(72) Inventors: Faris Majed Toqan, Chicago, IL (US); Robert Maciej Pieta, Chicago, IL (US)

(73) Assignee: ONENIGMA LLC, Chicago, IL (US)

( * ) Notice: Subject to any disclaimer, the term of this patent is extended or adjusted under 35 U.S.C. 154(b) by 118 days.

(21) Appl. No.: 15/234,711

(22) Filed: Aug. 11, 2016

(65) Prior Publication Data

US 2018/0046792 A1    Feb. 15, 2018

(51) Int. Cl.
| | | |
|---|---|---|
| G06F 7/04 | (2006.01) | |
| G06F 21/36 | (2013.01) | |
| G06F 3/0488 | (2013.01) | |
| G06K 9/00 | (2006.01) | |

(52) U.S. Cl.
CPC .......... *G06F 21/36* (2013.01); *G06F 3/04886* (2013.01); *G06K 9/00355* (2013.01); *G06K 9/00885* (2013.01); *G06K 9/00892* (2013.01)

(58) Field of Classification Search
None
See application file for complete search history.

(56) References Cited

U.S. PATENT DOCUMENTS

| | | |
|---|---|---|
| 9,301,140 B1 | 3/2016 | Costigan et al. |
| 2014/0173286 A1* | 6/2014 | Novak .................. G06F 21/316 713/176 |
| 2016/0057623 A1 | 2/2016 | Dutt et al. |

FOREIGN PATENT DOCUMENTS

WO    2014/093930 A1    6/2014

OTHER PUBLICATIONS

International Search Report dated Nov. 7, 1017 issued in corresponding International Application No. PCT/IB2017/000942.
Bo, et al., "Continuous User Identification via Touch and Movement Behavioral Biometrics", 33rd International Performance Computing and Communications Conference, IEEE, pp. 1-8, Dec. 2014.
Frank, et al., "Touchalytics: On the Applicability of Touchscreen Input as a Behavioral Biometric for Continuous Authentication", IEEE Transactions on Information Forensics and Security, vol. 8, No. 1, pp. 136-148, Jan. 2013.

* cited by examiner

*Primary Examiner* — Brandon S Hoffman
(74) *Attorney, Agent, or Firm* — Nath, Goldberg & Meyer; Jerald L. Meyer

(57) ABSTRACT

One or more users (42) are identified based on typing pattern and/or behavior in a computerized system. A typing input is generated by one or more authorized users (42) by touching a touch sensitive input interface (12) at a touch coordinate that is linked to a given interface element displayed by the input interface (12). Collected touch coordinates are processed to generate a typing pattern specific of the authorized users (42), and the user-specific typing pattern is stored in a database (20). Touch coordinates generated by an un-identified user are processed to generate a typing pattern specific of the un-identified user (42), and the typing pattern of the un-identified user (42) is compared with the user-specific typing pattern stored in the database (20). The un-identified user is identified as (42) as one of the authorized users or as a non-authorized user.

12 Claims, 4 Drawing Sheets

IDENTIFYING ONE OR MORE USERS BASED ON TYPING PATTERN AND/OR BEHAVIOR

BACKGROUND

Field

The disclosed technology relates to a method for identifying one or more users based on typing pattern and/or behavior in a computerized system and to a respective computerized system.

Background

Identification is an integral aspect of many different systems, for example, social media networks, email systems, payment systems, mobile commerce systems and so on. Fraudulent use of a user's identity and improper access has massive associated costs and other implications. For example, credit card fraud costs banks time, money and has become an increased problem with cyber-crime, phishing schemes, and other attempts designed to take advantage of fraudulent credit cards or means for payment.

Additionally, due to the scale of card fraud, issuing banks tend to implement quite aggressive strategies in order to combat the problem. This, however, leads to high false positive rates that cause inconveniences to cardholders and merchants resulting in high operational costs to the issuer. As an additional consequence, high volumes of false positives may also prevent the issuer from declining further transactions, leading to additional losses.

Existing risk-engine strategies do not have the benefit of information on user generated information (including online complaints regarding merchants, hidden charges, billing errors) and the real-time status of the cardholder, they are not well suited to cross-border transactions where behavioral and historical patterns do not fit the norm.

Moreover, without identification in real time at the point of sale between the various players in the ecosystem (e.g., banks, card companies, merchants, consumers), realtime fraud detection/prevention has been challenging to enable effectively.

Therefore, there is a need for a new solution whereby all parties to the financial ecosystem may benefit from user generated information and real time verification.

Similarly, new authentication solutions are also required for many other applications to tackle the costs due to fraudulent use. For example, the cost of someone "hacking" a social media account could be destroyed relationships and diminished revenue in the case of a corporate social media account.

Methods have been developed that monitor behavioral patterns of an authorized user when interacting with a given computerized system, e.g., when interacting with a smartphone. US 2014/0337243 A1 describes a method that uses the kinetic movement the user imposes on the smartphone when performing a certain task. Such tasks could be swiping on the screen of the user device, picking up a user device, pulling a user device out of a user pocket, lifting the user device to read the time, eye-tracking movements, eye-winking movements, jaw movement associated with the user speaking or shaking the user device. The kinetic movement is then used to generate a pattern unique of the authorized user. This pattern can then be used to distinguish between authenticated and non-authenticated persons.

U.S. Pat. No. 9,305,260 B2, U.S. Pat. No. 9,301,140 B1 and US 2016/0057623 A1 disclose methods including recording, analyzing and categorizing of user interface input via a touchpad, thereby synthesizing gestures and other behavioral features when interacting with the user device. The drawback of these methods is that they require complicated software and specific hardware components that are not part of the basic configuration of computerized systems like smartphones or tablets.

WO 2014/093930 A1 describes an authentication method in which a non-secret pattern is presented to the user in connection with an authentication sequence. The user is asked to reproduce the non-secret pattern. Access to the computerized system is granted depending on whether or not the reproduction matches the input signature. The presentation of the non-secret pattern is, however, not convenient to the authenticated or authorized user and may draw the un-identified user to the fact that this pattern is used for identification. The un-identified user may deliberately change the user's usual behavior when inputting the signature so that this authentication method may be prone to misuse.

SUMMARY

It is one task of the disclosed technology to present a method for identifying one or more users based on typing pattern and/or behavior that may be easily implemented to any given computerized system that comprises a touch sensitive input interface without the need to use non-secret patterns for identification. Moreover, the method should work as discreet as possible so that the user does not notice its execution and is not disturbed by its execution.

The task is solved by a method for identifying one or more users based on typing pattern and/or behavior in a computerized system, the method comprising the following steps:
  generating a typing input by one or more authorized users by touching a touch sensitive input interface at a touch coordinate that is linked to a given interface element displayed by the input interface,
  monitoring and collecting the touch coordinates by an input manager,
  processing the collected touch coordinates by a processing unit to generate a typing pattern specific of the authorized users,
  storing the user-specific typing pattern in a database,
  generating a typing input by an un-identified user,
  monitoring and collecting the touch coordinates by the input manager,
  processing the collected touch coordinates by a processing unit to generate a typing pattern specific of the un-identified user,
  comparing the typing pattern of the un-identified user with the user-specific typing pattern stored in the database, and
  identifying the un-identified user as one of the authorized users or as a non-authorized user by a system controller.

Within the following description a distinction between authorized users, non-authorized users and non-identified users is made. Authorized users are users who are the true users of a given login-profile having legitimate access to the system. Non-authorized users are the users illegally and/or fraudulently using a profile of an authorized user. Un-identified users are users that have not undergone the identification process so they cannot yet be classified as being an authorized or a non-authorized user. Instead of "authorized user" or "non-authorized user" the term "authenticated user" or "non-authenticated user" may be used.

A computerized system may be any device having a touch sensitive input interface, e.g., smartphones, tablets or ATMs.

Although attempts have been made in the prior art to use typing patterns as a way for identifying users, their performance is mediocre. Moreover, not all of the methods are implementable on smart devices having a touch sensitive input interface. The disclosed technology is based on the finding that the touch coordinates are a useful parameter to generate a typing pattern that is characteristic of a certain user. In touch sensitive input interfaces arrays of areas are defined, each area being linked to a given interface element representing an input option like a letter, number, symbol, sticker, or emoticon. When a user wants to input an input option like a certain character the user will touch the input interface that is assigned to this character. In almost all cases the arrangement of the letters displayed on the input interface is the same as in a customary keyboard. The areas linked to a given character are usually rectangular. It has been found that a user touches a given area within a preferred region of the area when inputting a text. A user may e.g., touch the area representing the letter "w" rather on the right edge, the area representing the letter "e" on the left edge and the area representing the letter "a" in the center. Thus, the touch coordinates can be analyzed by one or more suitable algorithms including neural networks, support vector machines, naive bayes classification, nearest neighbor classification, and statistical analysis implemented in the processing unit, thereby generating a typing pattern characteristic of the user who is interacting with the system using the input interface.

The uniqueness of the typing patterns based on the touch coordinates can be used for the identification of one or more users. The touch coordinates are collected when the authorized user is interacting with the system. This is preferably done starting from the first time the system, e.g., the smartphone or tablet, is used. Particularly when the system is started the first time and certain setup-routines have to be executed it is highly likely that the authorized user is indeed using the system; however, by the time the system is used for the first time the user is not authorized yet and is considered as an un-identified user according to the definition given above.

When using a system or an app for the first time, following steps may be executed:
1. Open the app (user is not authorized or authenticated yet)
2. Type in the username and password, thereby collecting typing input, (user is still not authorized or authenticated)
3. Send collected and processed typing input to a server (still not authorized or authenticated)
4. The server either authorizes the user or not (earliest moment the user is authorized or authenticated)
5. Now the typing data can be associated with the authorized or authenticated user Only after step 4 it is possible to determine that the user was the rightful owner of the account; however, at the time of typing on the input interface for the very first time the user is neither authorized nor authenticated.

It is possible but not necessary to use "non-secret patterns" that the user has to reproduce to initiate the method to guarantee that a representative pattern is generated. Once sufficient data is available, i.e., enough touch coordinates have been collected by the input manager, the touch coordinates are processed by the processing unit using one or more of the algorithms mentioned above, thereby generating a typing pattern. This pattern is then stored in a database.

When an un-identified user is logging on the system, the steps described above are repeated and a second typing pattern is generated that can be compared with the one of the authorized user. The two typing patterns are then compared by the system controller resulting in information on whether or not the un-identified user is the authorized user or a non-authorized user. It is noted that the second typing pattern may only comprise very few touch coordinates. Inputting a four-letter pin code may be sufficient.

The touch coordinates may be generated in that the user touches the input interface with the user's fingers ("tap function"); however, the input interface may also be operated using the so-called "swipe function". In this case the user does not individually touch the areas defined above but leaves the finger on the input interface, moving this finger from one area to the other. In this case the touch coordinates used for creating the typing patters may be those ones where the direction of the finger movement significantly changes.

The use of the touch coordinates for the generation of typing patterns has been found to be easy to implement and to lead to reliable results within a short time. The present method for identifying one or more users based on typing pattern is language-independent. It works, e.g., for English input as well as for Arabic input.

The method may include a function allowing a second user having a different typing pattern to use the system. This could be done in that information is given to the system that from now on until the next log-out or for the next definably time period the second user is using the system who should also be considered as an authorized person. The method then generates a second pattern linked to the second authorized user. Thus it is possible that a number of authorized users with legitimate access is defined. When logging on the method compares the typing pattern with the ones stored in the database marked as belonging to an authorized user. As soon as one of the stored typing pattern matches with the one generated by the user trying to log in, the access may be granted.

In a further embodiment of the method the typing input is generated by normal interaction of the users with the computerized system. As mentioned above, a "non-secret pattern" may be used for generating the typing patterns. This "non-secret pattern" draws the user and in particular the non-authorized user to the fact that typing patterns are created which may defeat the purpose of the present method. Generating the typing input by normal interaction of the user with the system makes the method very discreet without disturbing the user. Moreover, in particular the non-authorized user will not notice that the typing pattern is generated so that the non-authorized user does not have a chance to deliberately use a different typing pattern or otherwise outflank the method. Thus, the level of security of the present method is enhanced.

In another embodiment the further access to the computerized system is denied in case the un-identified user is identified as a non-authorized user. In this case the non-authorized user cannot further use the system anymore. This embodiment may be particularly suited for systems storing very sensitive data like construction plans or military or governmental documents.

A further embodiment is characterized in that the further access to the computerized system is granted in case the un-identified user is identified as a non-authorized user and a message is generated that the computerized system is accessed by a non-authorized user. In certain cases it is acceptable that a non-authorized user can interact with the system as long as all interactions are marked with a flag indicating that these interactions are conducted by a non-authorized user. The non-authorized user may transfer money, however, the bank will receive the message that this money transfer was conducted by an alleged non-authorized user. The bank may then contact the authorized user via other channels asking the user to confirm or reject the money transfer. In this embodiment false access denials may be avoided. Moreover, this embodiment makes it possible to allow other users having a different typing pattern to gain access to the system. Once the authorized user confirms the money transfer the typing pattern created by the non-authorized user will be marked as belonging to a second authorized person.

According to another embodiment the user can choose between a number of input interfaces and wherein in the typing pattern contains information on the input interface the typing input is generated with. In many cases one given authorized user uses more than one device for logging on to a given system. As an example, the user may once use a smartphone and another time a tablet to log on to the user's bank account, each device having its own input interface. Due to the different size of the smartphone compared to the tablet the typing patterns may differ. While a smartphone may be held in hand when generating any typing input the tablet may be placed on a table. In this embodiment device-specific typing patterns may be generated for a number of devices but for the same user. False access denial due to the use of different devices by the authorized user is thus avoided.

In a further embodiment the input manager monitors and collects the pressure with which the user touches the input interface to generate the typing input. The pressure is a further parameter next to the touch coordinates to further improve the quality of the typing pattern, thereby reducing the likelihood of false access denials or grants.

According to another embodiment the spatial orientation of the input interface is measured when the user touches the input interface to generate the typing input. As already mentioned above, the user may hold a smartphone in the user's hand whereas the user may place a tablet on a table when generating a typing input; however, a non-authorized user may have other habits and may also place a smartphone on a table or another underlay. Thus, the spatial orientation is a further parameter next to the touch coordinates to further improve the quality of the typing pattern, thereby reducing the likelihood of false access denials or grants.

In a further embodiment the movement of the input interface is measured when the user touches the input interface to generate the typing input. When placed on a table the movement of the input interface upon the generation of a typing input is different from the case in which the input interface is held in hand. Thus, the movement of the input interface is a further parameter next to the touch coordinates to further improve the quality of the typing pattern, thereby reducing the likelihood of false access denials or grants.

According to another embodiment the duration of touch and/or the average time between touches are measured when the user touches the input interface to generate the typing input. It has been found that the duration of the touch and the time between touches also vary from user to user. Thus, the duration of touch and/or the average time between touches are further parameters to improve the quality of the typing pattern, thereby reducing the likelihood of false access denials or grants. Although touch sensitive input interfaces to not have physical keyboards they are typically arranged to represent physical keyboards.

In a further embodiment the slide distance is measured when the user touches the input interface to generate the typing input. As mentioned above many tablets and smartphones offer the possibility to generate typing input by using the swipe-function. The slide distance is the distance the finger follows from one to another area. Some users may move the finger from one area to another following a rather straight line whereas other users may follow a rather curved line so that the slide distance is different from user to user. Thus, the slide distance is a further parameter to improve the quality of the typing pattern, thereby reducing the likelihood of false access denials and grants.

According to another embodiment the position is determined when the user touches the input interface to generate the typing input. In case the system is embodied as a mobile device the system can be used independent from any locations. Nevertheless, a given user uses the system predominantly within a certain area, in particular at the user's home and/or at the user's business office. The use of the system outside these areas may be an indication of fraud. The position may be determined by a GPS module.

In a further embodiment the user and/or the surroundings of the user are detected when the user touches the input interface to generate the typing input. A camera may be used for this purpose which can characterize the authorized user, e.g., by its body shape. As stated above, the user will use the system predominantly at the same positions and thus in the same surroundings. The camera may characterize the surroundings, e.g., the room in which the user usually uses the system. The camera may create a redundancy in case the GPS-signal is not available and thus the position cannot be detected.

The more parameters are considered the typing pattern also reflects a typing behavior as not only the typing as such is characterized but also how the user treats the device when generating a typing input. The reliability of the identification method is thus improved.

Another aspect of the disclosed technology is directed to a computerized system for executing a method for identifying one or more users based on typing pattern and/or behavior according to one of the embodiments presented above, the system including:
 a touch sensitive input interface for generating a number of typing inputs by authenticated and/or non-authorized users touching the input interface at a touch coordinate that is linked to a given interface element displayed by the input interface,
 an input manager for monitoring and collecting the touch coordinates,
 a processing unit to generate a number of typing patterns by processing the collected touch coordinates,
 a database for storing the typing patterns, and
 a system controller for comparing the typing patterns stored in the database and for identifying an un-identified user as one of the authorized users or as a non-authorized user.

The technical effects and advantages as discussed with regard to the present method equally apply to the system. Briefly, the use of the touch coordinates to generate typing patterns for identifying a user proved to be very reliable and easy to implement.

In a further implementation the system comprises one or more a rate or environment sensing instrument. Non-limiting examples of rate or environment sensing instruments are:

a force or pressure measuring unit for calculating or measuring the pressure with which the user touches the input interface, and/or a gyroscope for measuring the spatial orientation of the input interface when the user touches the input interface, and/or an accelerometer for measuring the movement of the input interface when the user touches the input interface, and/or a timing unit for measuring the duration of touch and/or the average time between touches when the user touches the input interface, and/or a distance measuring unit to measure the distance when the user touches the input interface.

In this implementation the system is equipped with many hardware components that provide useful parameters that may be used in the typing patterns. The more parameters characterizing the generation of the typing input are considered in the typing pattern the more reliable the authentication is and the less likely is the generation of false access grants or denials. It is noted that other parameters not mentioned above may be considered when generating the typing pattern. Moreover, combined parameters may be considered. One example may be that one user touches the input interface rather quickly whereas another user touches it more slowly. The change of the pressure upon pressing the input interface may thus also be considered in the typing pattern. The parameters of the force or pressure measuring unit and the timing unit are thus combined.

BRIEF DESCRIPTION OF THE DRAWINGS

The disclosed technology is described in detail with reference to the drawings attached wherein.

DETAILED DESCRIPTION

Reference will now be made in detail to the present exemplary bodies of the disclosure, example of what are illustrated in the accompanying drawings. Whenever possible, the same or similar reference numbers will be used throughout.

Figure 1:
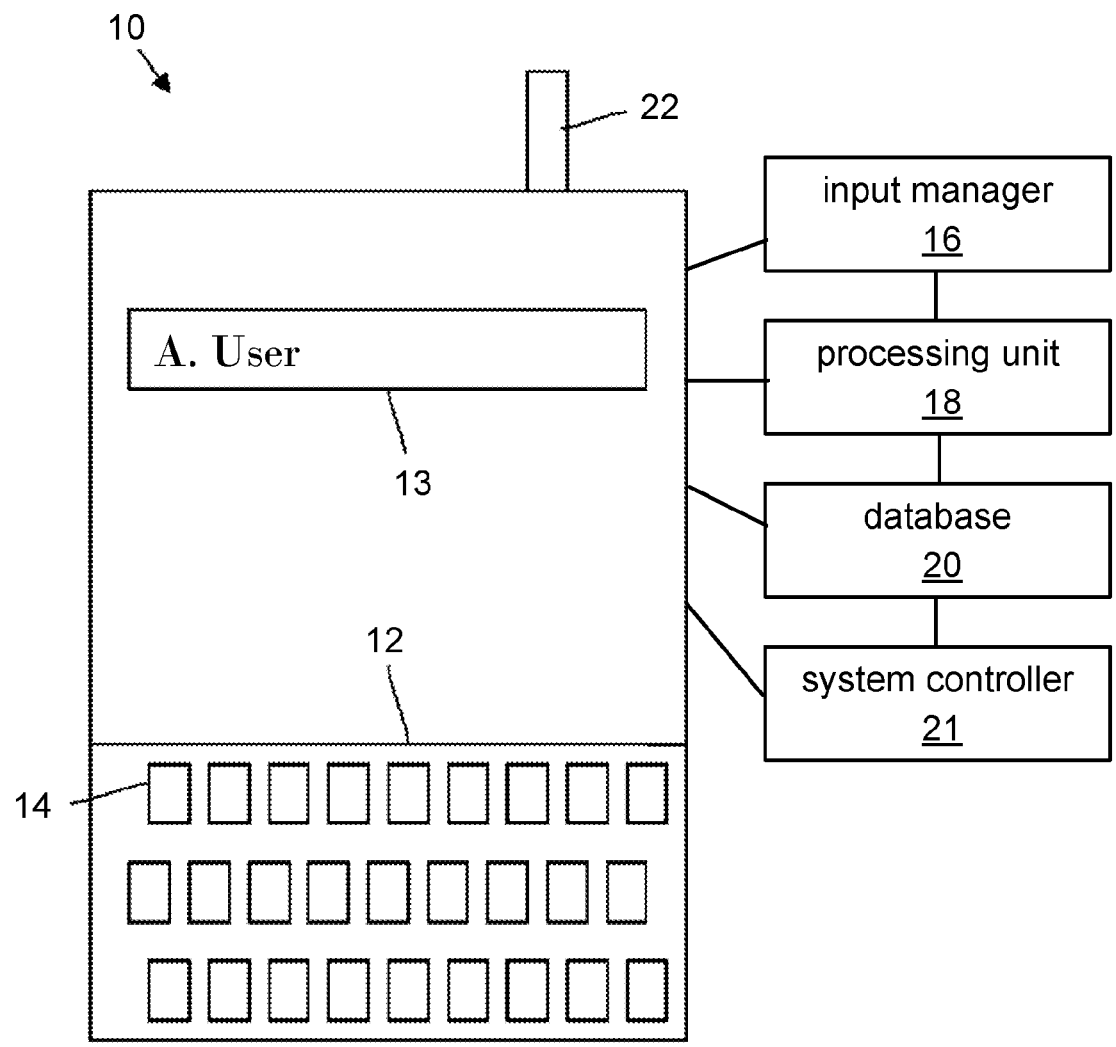
FIG. 1 shows a first embodiment of the system.

FIG. 1 shows a first embodiment of a computerized system 10 for identifying one or more users based on typing pattern and/or behavior. The system 10 may be embodied as a smart device (e.g., smartphone, tablet) and comprises a touch sensitive input interface 12 a user 42 (cf. FIG. 3) may use to generate typing inputs by touching the surface of the input interface 12. The input interface 12 is subdivided in a number of areas 14 representing a given character like a number or a letter or other symbols. The areas 14 define a range of touch coordinates preferably comprising an x-coordinate and a y-coordinate. Once the user 42 touches the input interface 12 in a given position the input interface 12 creates the respective touch coordinates. As a result the character linked to the area 14 comprising the created touch coordinates is inputted. The inputted characters are then displayed in a text field 13.

The touch coordinates can not only be created by separately touching the input interface 12 but also using the so-called swipe function in which the user 42 does not remove its finger from the surface when generating a typing input. In this case the touch coordinates are generated by considering changes in the direction of the finger movement.

The system 10 further comprises an input manager 16 that monitors and collects the touch coordinates generated by the input interface 12. The collected touch coordinates are then transferred to a processing unit 18 processing the collected touch coordinates using any suitable algorithms to generate a typing pattern. The typing patterns are then stored in a database 20. A system controller 21 may access the database 20 to compare the stored typing pattern with other typing patterns as will later be described in greater detail.

In this embodiment the input manager 16, the processing unit 18, the database 20 and the system controller 21 are located remote from the touch sensitive input interface 12. Thus, the system 10 comprises a transceiver 22 for establishing the remote communication at least between the input interface 12 and the input manager 16.

Figure 2:
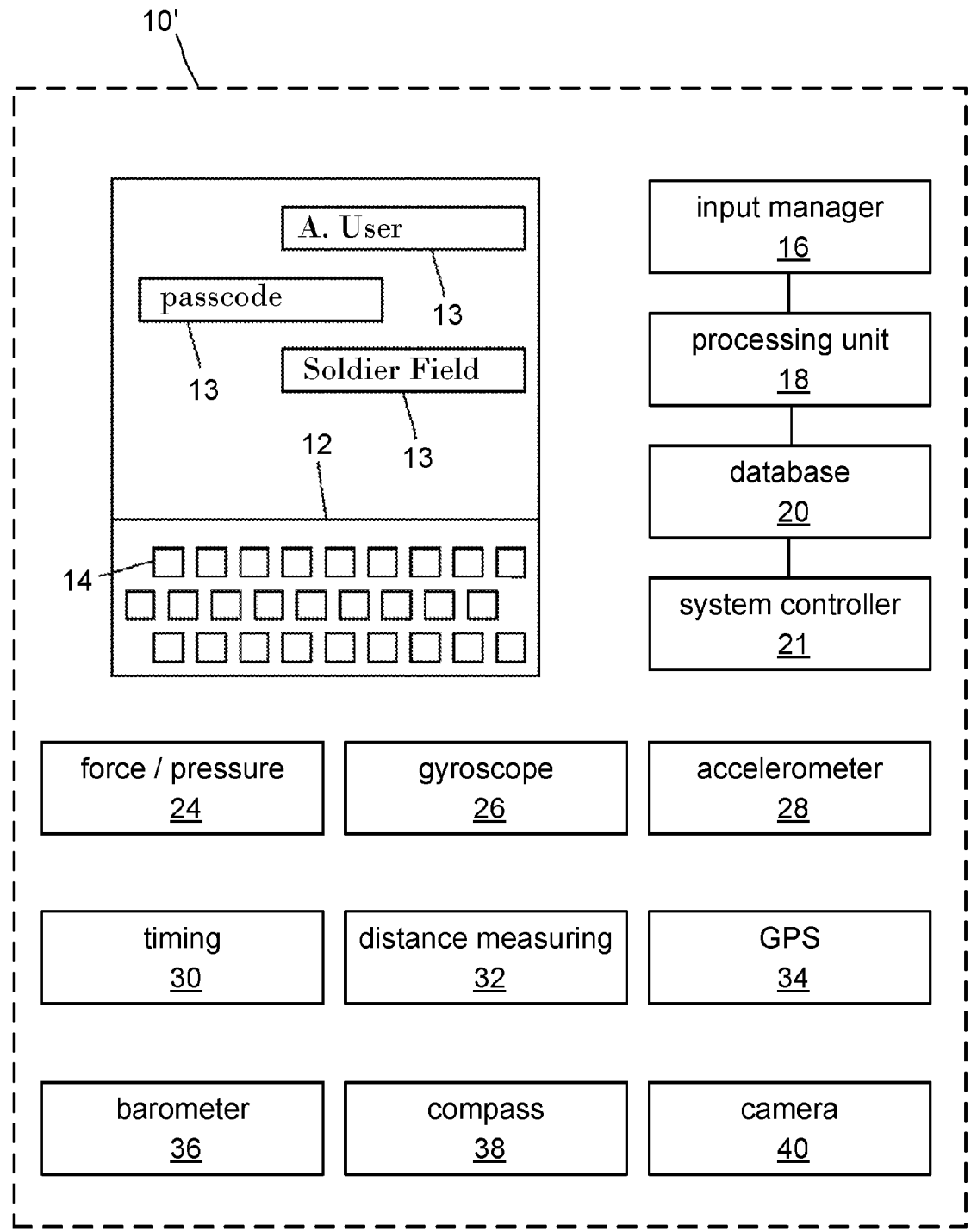
FIG. 2 shows a second embodiment of the system.

In FIG. 2 a second embodiment of the system 10' is shown which may also be a smart device. It comprises the same components as the first embodiment, however, the touch sensitive input interface 12, the input manager 16, the processing unit 18, the database 20 and the system controller 21 are located within the same unit. A transceiver 22 for establishing the communication with the input interface 12 is thus not needed.

Moreover, the system 10' according to the second embodiment is further comprising a force or pressure measuring unit 24 for calculating or measuring the pressure with which the user 42 touches the input interface 12. Further, the system 10' has a gyroscope 26 for measuring the spatial orientation of the input interface 12 when the user 42 touches the input interface 12. Beyond that, the system 10' is equipped with an accelerometer 28 for measuring the movement of the input interface 12 when the user 42 touches the input interface 12. A timing unit 30 for measuring the duration of touch and/or the average time between touches when the user 42 touches the input interface 12 is also included in the system 10' according to the second embodiment. It is noted that the input interface 12 does not comprise physical keys, however, the areas defined above represent keys of a physical keyboard. Moreover the system 10' comprises a distance measuring unit 32 to measure the distance when the user 42 touches the input interface 12.

The system 10' further comprises a GPS module 34 that indicates the location or position of the system 10' when the user 42 touches the input interface 12. The GPS module 34 may be supported by a barometer 36 and a compass 38 that enhance the precision of the position determination. The GPS module 34 may also be used to determine whether or not a user 42 is moving (e.g., driving or walking) while generating the typing input or not. In case the authorized users 42 never move when generating the typing input the generation of the typing input when moving may be an indication of fraud. Although the signals of the accelerometer are mainly used to detect the movements of the system 10' when the user 42 is generating the typing input the signals of the accelerometer may also be used to determine whether the user 42 is driving or walking when generating the typing input when correctly interpreted. Thus, the signals of the accelerometer may be used in redundancy to the signals of the GPS module.

The system 10' is further equipped with a camera 40. The camera 40 can be used to characterize the authorized user 42 and the position the user 42 usually uses the system 10'.

All the components mentioned above are usually part of any state-of-the-art smart devices so the method as described in the following is implementable without hardware changes, which enhances the applicability of the method. It is noted that parameters provided by components not mentioned here but may be useful in defining a typing pattern may also be considered.

Figure 3:
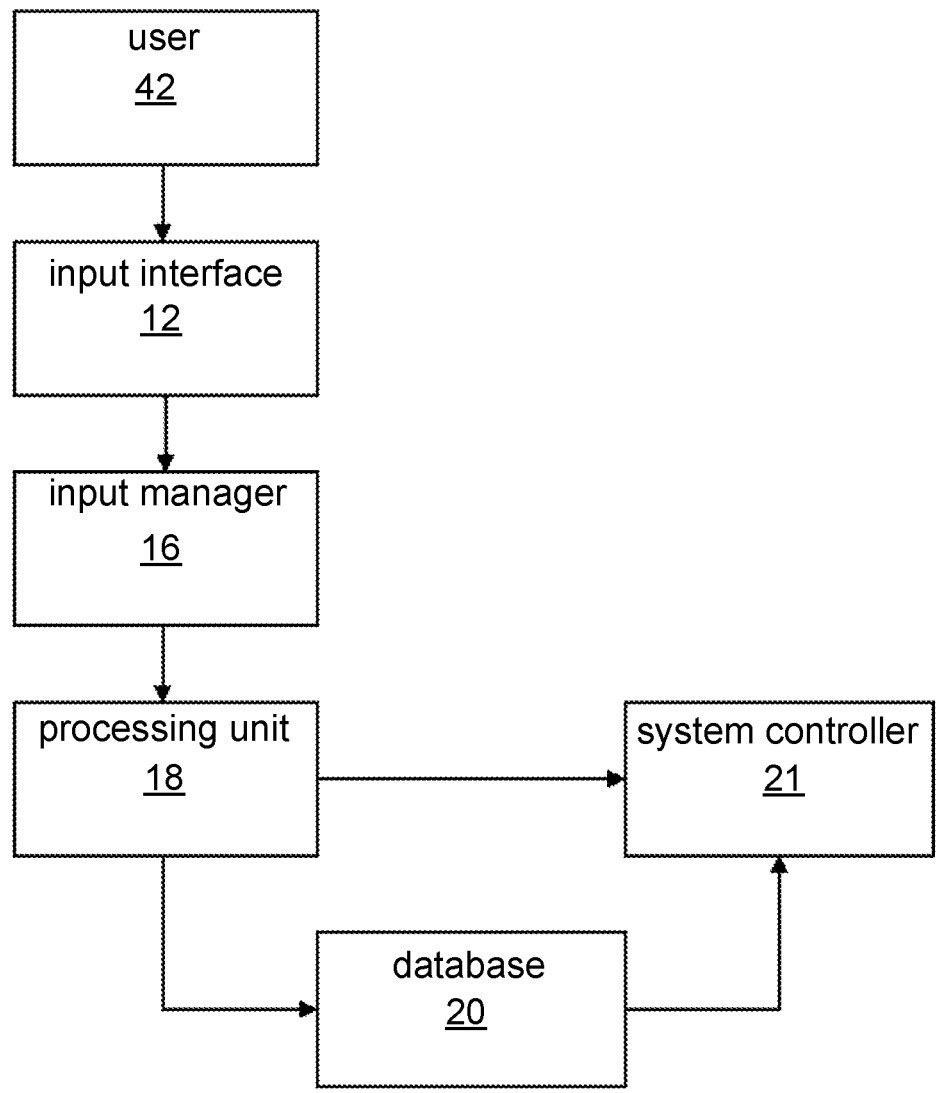
FIG. 3 is an illustration of the method.

FIG. 3 is a diagram illustrating an exemplary method for identifying a user 42 based on typing pattern and/or behavior. A user 42 may use any touch sensitive input interface 12, such as a virtual keyboard in a smartphone, smartwatch, website, smart car, smart tv, virtual reality headset, augmented reality headset, or other computerized application, to enter input. The input interface 12 may be controlled via the user's body, such as the user's fingertips, hands, arms, eyes, or head, or an external device, such as a mechanical keyboard or virtual laser keyboard. An exemplary input interface 12 is a virtual keyboard on a smartphone controlled via the user's fingertips by accepting touch sensitive input to determine touch coordinates.

The input manager 16 monitors and collects the user's typing input. The input manager 16 may be implemented in various ways. For example, the input manager 16 may be a general purpose computer, a server, a mainframe, or any combination of those components. The input manager 16 may be standalone, or it may be part of a subsystem, which, in turn, may be part of a larger system. The input manager 16 may monitor and track user typing via continuous or task-based methods, and may store temporarily or permanently the user's typing via a local or remote database 20, such as an in-memory array, SQL store, or data file. While monitoring and tracking the user's input, the input manager 16 may monitor or track and collect a single data point or a plurality of data points such as a UNIX timestamp, touch coordinate, gyroscope 26 data, accelerometer 28 data, force, and key tapped. The input manager 16 may also track a single calculated data point, or plurality of calculated data points, such as duration of touch, slide distance, device orientation change, device spatial orientation, and the average time between touches. Any behavior and/or pattern identified during user 42 input can constitute the user's typing behavior and/or pattern. In that manner, the rate or environment sensing instrument can be used in combination with the input interface 12 in order to generate and compare the typing patterns of the authorized users and the un-identified user in addition to the touch sensitive input interface (12).

One implementation of the input manager 16 can be an in-memory cache using an array. Each item in the array represents a user 42 input data point with the following information: starting touch coordinate with x and y location, ending touch coordinate with x and y location, and letter selected. In the array, each data point can be represented as a string. For example, the in-memory array for a user 42 input of "remember" could be represented as:

[
"(135.5,45.0) (135.5, 45.0) r",
"(102.5,30.0) (102.5, 30.0) e",
"(291.0,134.5) (291.0,134.5) m",
"(96.5, 30.5) (96.5, 30.5) e",
"(265.5.0, 136.0) (265.5.0, 136.0) m",
"(222.5,142.5) (222.5,142.5) b",
"(100.0,27.5) (100.0,27.5) e",
"(130.5, 27.5) (130.5, 27.5) r"
]

The processing unit 18 processes collected user typing behavior and/or pattern. The processing unit 18 may be implemented in various ways. For example the processing unit 18 may be a general purpose computer, a server, a mainframe, or any combination of those components. The processing unit 18 may be standalone, or it may be part of a subsystem, which, in turn, may be part of a larger system.

To process collected user typing behavior and patterns, the processing unit 18 may employ and perform a one or more process methods including compression, hashing, restructuring, abstraction, dimensionality reduction, and formatting. The processing unit 18 can implement one or more algorithms including neural networks, support vector machines, naive bayes classification, nearest neighbor classification, and statistical analysis. As a result of processing, the processing unit 18 can produce a single metric in a single or multiple data formats, or a plurality of metrics in a plurality of data formats including strings, complex structures, bytes, tokens, or other data representation. The processing unit 18 may be implemented as real time collection system, cached information storage database 20 or databases 20, or other collection system, or any combination of collection systems 10 or 10'.

One implementation of processing unit 18 can be a feature vector comprising two hashmaps:

1. A hashmap with a key representing the letter, and a value representing an array of data points. We can refer to this hashmap as the letters hashmap.
2. A hashmap with a key representing a sequence of two letters, and a value representing an array of data points. We can refer to this hashmap as the sequence hashmap.

For the user 42 input "remember" the letters hashmap can be represented as:

[
"r": ["(135.5,45.0) (135.5, 45.0) r", "(130.5, 27.5) (130.5, 27.5) r"],
"e": ["(102.5,30.0) (102.5, 30.0) e", "(96.5, 30.5) (96.5, 30.5) e", "(100.0,27.5) (100.0,27.5) e"],
"m": ["(291.0,134.5) (291.0,134.5) m", "(265.5.0, 136.0) (265.5.0, 136.0) m"],
"b": ["(222.5,142.5) (222.5,142.5) b"]
]

For the user 42 input "remember" the sequence hashmap can be represented as:

[
"r": ["(135.5,45.0) (135.5, 45.0) r"],
"re": ["(102.5,30.0) (102.5, 30.0) e"],

```
"em": [ "(291.0,134.5) (291.0,134.5) m", "(265.5.0, 136.0) (265.5.0, 136.0)
m" ],
"me": [ "(96.5, 30.5) (96.5, 30.5) e" ],
"mb": [ "(222.5,142.5) (222.5,142.5) b" ],
"be": [ "(100.0,27.5) (100.0,27.5) e" ],
"er": [ "(130.5, 27.5) (130.5, 27.5) r" ]
]
```

Once processing is complete, the processing unit 18 transmits the processed data to the database 20 and the system controller 21.

The database 20 stores previous and current user typing behavior and patterns. The database 20 may be implemented in various ways. For example the database 20 may be a general purpose computer, a server, a mainframe, or any combination of those components. The database 20 may be standalone, or it may be part of a subsystem, which, in turn, may be part of a larger system. The database 20 can implement one or more optimization techniques including indexing and compression, using one or more different formats including SQL, XML, and NoSQL.

One implementation of database 20 can be a file stored on a system hard drive. One feature vector component (letters hashmap or sequence hashmap) is stored per line in the file. Each feature vector is separated by the delimiter "--".

The system controller 21 identifies a user 42 based on previous and current typing behavior and patterns from a remote or local database 20. The system controller 21 may be implemented in various ways. For example the system controller 21 may be a general purpose computer, a server, a mainframe, or any combination of those components. The system controller 21 may be standalone, or it may be part of a subsystem, which, in turn, may be part of a larger system. The system controller 21 can implement a one or more algorithms including neural networks, support vector machines, naive bayes classification, nearest neighbor classification, and statistical analysis.

The system controller 21 may identify the user 42 directly, generate a single evaluation metric, or a plurality of evaluation metrics. The evaluation metric may represent a confidence interval, statistical similarity, or other representation. The system controller 21 can implement one or more algorithms including neural networks, support vector machines, naive bayes classification, nearest neighbor classification, and statistical analysis. The system controller 21 may identify users based on a ranking implemented as linear distance, best fit, logarithmic fit, highest score, or other ranking method, or any combination of those methods.

One implementation of system controller 21 can be an in-memory controller using a lowest score ranking method for identifying a user 42 for a set of all users in the local database 20. Upon request and receipt of a feature vector, the system controller 21 queries the local database 20 for all feature vectors. For each available user 42 and feature vector, the system controller 21 implements the following algorithm:

```
function datapoint_compare
    input: datapoint this
    datapoint other
    output: datapoint comparison score
    x <- distance between this.end_x and other.end_x
    y <- distance between this.end_y and other.end_y
    return (x times x) plus (y times y)
function user 42_compare
    input: feature vector X representing the user 42 to identify
    feature vector Y representing a known user 42 Z
    output: user 42 comparison score
    score <- 0
    operations <- 0
    for datapoint D in X
    if D follows a sequence S in Y.sequence_hashmap
        datapoints <- Y.sequence_hashmap [S]
        s <- min datapoint_compare for D and D' in datapoints
        add s to score
        add 1 to operations
    otherwise if D is a letter L in Y.letters_hashmap
        datapoints <- Y.letters_hashmap[L]
        s <- min datapoint_compare for D and D' in datapoints
        add s to score
        add 1 to operations
    return score divided by operations
program identify
    input: feature vector I to identify
    output: identified user 42
    candidates <- list
    for user 42 U in the system 10 database 20
    s <- user 42_compare for feature vector I and user 42 U
    add user 42 U with score s to candidates
    return the user 42 with the smallest score in candidates
```

Consider two users A, B with the following feature vectors stored in a local database 20 representing the user 42 input "hey".

```
User 42 A Previous feature vector FVA
[
    "h": [ "(216.0,84.5) (216.0, 84.5) h" ],
    "e": [ "(91.0,26.0) (91.0,26.0) e" ],
    "y": [ "(210.5,39.5) (210.5,39.5) y" ]
]
[
    "he": [ "(91.0,26.0) (91.0,26.0) e" ],
    "ey": [ "(210.5,39.5) (210.5,39.5) y" ]
]
User 42 B Previous feature vector FVB
[
    "h": [(233.0,86.0) (230.5,87.0) h" ],
    "e": [ "(89.5,26.0) (98.0,24.5) e" ],
    "y": [ "(201.5,30.0) (199.0, 32.5) y" ]
]
[
    "he": [ "(89.5,26.0) (98.0,24.5) e" ],
    "ey": [ "(201.5,30.0) (199.0, 32.5) y" ]
]
```

Now consider the following input feature vector FVI to so a user 42 can be identified:

```
[
    "h": [ "(215.0,90.5) (215.0,90.5) h" ],
    "e": [ "(92.5,28.5) (92.5,28.5) e" ],
    "y": [ "(208.0,37.0) (208.0,37.0) y" ]
]
[
    "he": [ "(92.5,28.5) (92.5,28.5) e" ],
    "ey": [ "(208.0,37.0) (208.0,37.0) y" ]
]
```

Using users A and B along with feature vector s FVA, FVB, and FVI as input to the identify algorithm, the following scores are produced:

User 42 A: 15.8

User 42 B: 109.5

The minimum score is 15.8 associated with user 42 A, and therefore the input feature vector FVI is identified as user 42 A.

Transmission between any local or remote system 10, 10' components may be performed using local methods, such as a file pointer or in-memory object, or remote methods such as an HTTP connection or HTTPS connection.

Figure 4:
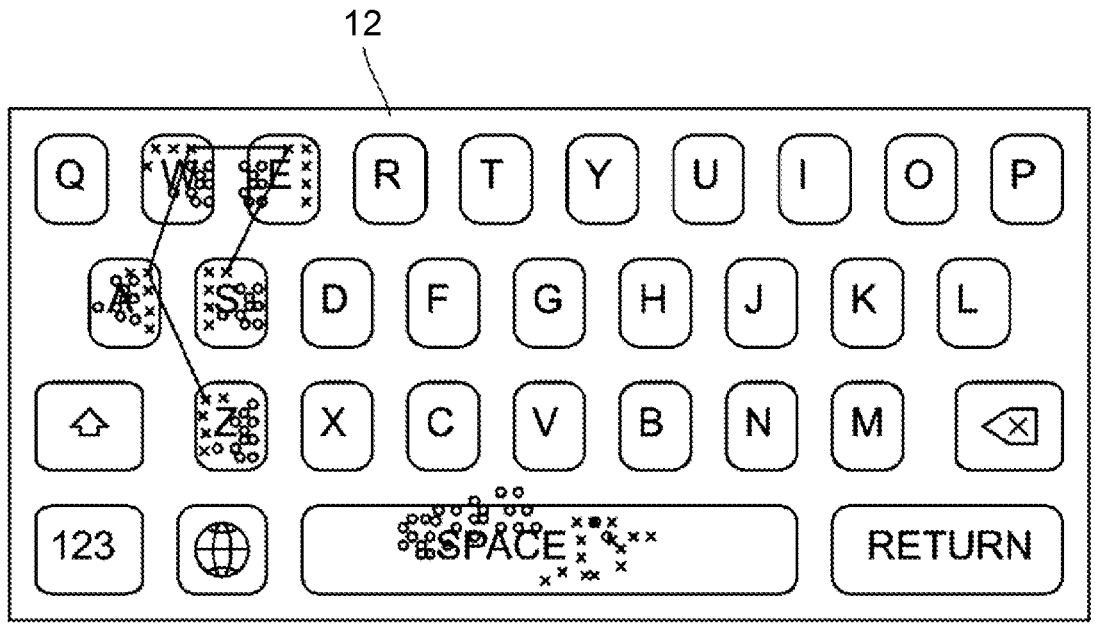
FIG. 4 shows a visualization of two typing patterns of authorized users on a touch sensitive input interface.

FIG. 4 shows a touch sensitive input interface 12 that is used by two authorized users. An exemplary typing input generated by the first user 42 is indicated by crosses and the typing input generated by the second authorized user 42 is indicated by circles. For the sake of clarity, generation of the typing patterns is explained by means of the letters "w", "e", "a", "s" and "z" as well as of the space bar.

The first authorized user 42 is touching the areas linked to the letters "w", "s" and "z" rather toward the left edge, whereas the user touches the area 14 of the letters "e" and "a" towards the right edge. The first authorized author touches the space bar right of the center.

The second authorized user 42 is touching the "w", "s" and "z" rather toward the right edge, whereas the user touches the area 14 of the letter "a" fairly central and the area 14 of letter "e" on the left edge. It is noted that the second authorized user 42 sometimes exceeds the left edge of the area 14 linked to the letter "e". The space bar is touched by the second authorized user 42 left of the center towards the upper edge, sometimes exceeding the upper edge.

The first user 42 sometimes uses the swipe function of the system 10, 10'. The touch coordinates are then generated taking the touch coordinates where the direction of the movement of the finger is changing.

These characteristics are represented by the touch coordinates that are processed by the processing unit 18 and stored in the database 20. The method and the system 10, 10' are self-learning so that the typing pattern of a given authorized user 42 gets improved the more the authorized user 42 is using the system 10, 10'. The method preferably runs in the background so that no active participation of the user 42 in the generation of the typing pattern is needed. The method is thus passive from the perspective of the user 42.

The typing patterns may create clusters in which the probability of the respective user 42 to touch a given area 14 is higher than outside the cluster. When a given un-identified user 42 tries to log on the system 10, 10' and touches the space bar right of the center, the area 14 of letters "w", "s" and "z" rather toward the left edge and the area 14 of the letters "e" and "a" towards the right edge it is very likely that the un-identified user 42 is the first authorized user 42. In the same way the method may identify the second authorized user 42. The method may thus identify the un-identified user 42 as the first or the second authorized user 42 and grant access to the system 10, 10'.

Figure 5:
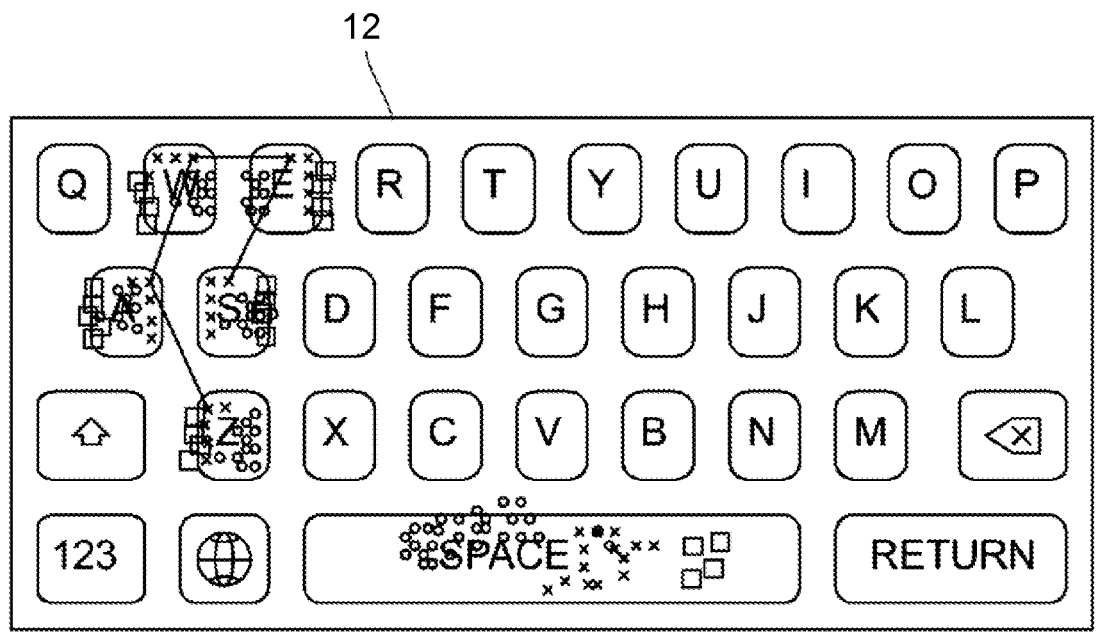
FIG. 5 shows a visualization of a typing pattern of authorized users and a non-authorized user on a touch sensitive input interface.

In FIG. 5 the touch sensitive input interface 12 is shown that is now used by a further un-identified user 42 trying to log on the system 10, 10'. The touch coordinates at which the further non-identified user 42 touches the input interface 12 is marked with squares. It is noted that the un-identified user 42 touches the space bar further to the right than the first and the second authorized user 42. The unauthorized user 42 further touches the areas linked to the letters "w", "a" and "z" at the left edge, often exceeding the left edge. Conversely, the unauthorized user 42 touches the areas linked to the letters "e" and "s" at the right edge, also sometimes exceeding the right edges.

When the system 10, 10' monitors the touch coordinates generated by the un-identified user 42 thereby generating a typing pattern of the un-identified user 42 it will notice that the typing pattern does not match to any of the typing patterns stored in the database 20. The method may define a threshold regarding the differences in the typing patterns. Once the threshold is exceeded the method either denies access to the system 10, 10' or it generates a flag or a message indicating that it has identified the un-identified user 42 as a non-authorized user 42. It is noted that the typing pattern can already be established based on only a few numbers of inputs. The input of a four character pin code may be sufficient.

The system 10' as illustrated in FIG. 2 comprises a number of additional components that measure parameters that may further characterize the generation of the typing input. The more parameters are included in the generation of the typing pattern the better it represents the typing behavior and the more precise the identification process gets. False access denials and grants are reduced. Next to the parameters already mentioned the following parameters may be considered:

Touch speed, touch duration, time between touches, duration overlap between touches, touch movement distance, touch movement duration.

The system 10, 10' may so contain additional input components (example: external keyboard attached to a tablet) and collect data from these additional input components. The user typing behavior may distinguish metrics individually for the start of a touch, each tracked movement of a touch, and the end of a touch. The user typing behavior may also comprise of additional metrics collected from the computer device or additional input components. The user typing behavior may also comprise of computed metrics or aggregate metrics. The typing pattern comprises of all typing input like alphabetic characters, whitespace, numerical characters, delete, return, state switch, emoji, stickers, reactions, suggested text, and predictive text. The typing patterns and behavior can be secured for transmission to a remote server or database 20 through methods such as encryption, compression, reduction, and/or transformation. The typing pattern and behavior can be translated into a universal vector space such that user typing behavior can be compared between different input devices. The storage can be in-memory, on device disk, in a structured database 20 using a structured database 20 format, in a single file or in multiple files, possibly encrypted, compressed, transformed, or reduced. The identification does not require an exact match. Instead of preventing access to secure resources, our method can flag or otherwise mark the authentication attempt as suspicious. Identification can be performed in a single-identification scenario (like login) or a continuous identification scenario (like a chat application). Identification can be performed through various methods like statistical comparison, machine learning, probability, or other comparison method. Identification can result in a single Boolean decision, a confidence interval, user 42 set, or specific identified user 42, or other metric. Capture, storage, and identification may be performed locally on the device or on a remote machine. Capture, storage, and identification may be performed on foreground or background processes or threads.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

REFERENCE LIST

10, 10' system
12 input interface 13 text field
14 area
16 input manager
18 processing unit
20 database
21 system controller
22 transceiver
24 force or pressure measuring unit
26 gyroscope
28 accelerometer
30 timing unit
32 distance measuring unit
34 GPS module
36 barometer
38 compass
40 camera
42 user

The invention claimed is:

1. A method for identifying one or more users (42) based on typing pattern and/or behavior in a computerized system, the method comprising the following steps:
  generating a typing input by one or more authorized users (42) by touching a touch sensitive input interface (12) at a touch coordinate that is linked to a given key displayed by the input interface (12), wherein the touch sensitive input interface (12) is a direct interface of a computerized system (10);
  monitoring and collecting the touch coordinates by an input manager (16);
  measuring a slide distance when the one or more authorized users (42) touches the input interface (12) to generate the typing input;
  processing the collected touch coordinates and the measured slide distance by a processing unit (18) to generate a typing pattern specific of the authorized users (42);
  storing the user-specific typing pattern on a database (20);
  generating a typing input by an un-identified user (42);
  monitoring and collecting the touch coordinates from the un-identified user by the input manager (16);
  measuring the slide distance from the un-identified user;
  processing the collected touch coordinates and the slide distance from the un-identified user by a processing unit (18) to generate a typing pattern specific of the un-identified user (42);
  comparing the typing pattern of the un-identified user (42) with the user-specific typing pattern stored in the database (20);
  identifying the un-identified user (42) as one of the authorized users (42) or as a non-authorized user (42) by a system controller (21); and
  gaining access to the computerized system (10) if the un-identified user (42) is identified as one of the authorized users (42), otherwise denying access to the computerized system (10) if the un-identified user (42) is identified as a non-authorized user (42).

2. The method according to claim 1, further comprising the step of using at least one rate, force or environment sensing instrument to generate and compare the typing patterns of the authorized users and the un-identified user in addition to the touch sensitive input interface (12).

3. The method according to claim 2, wherein the at least one rate, force or environment sensing instrument comprises one or more sensing instruments selected from the group consisting of:
  a force or pressure measuring unit (24) for calculating or measuring the pressure with which the user (42) touches the input interface (12),
  a gyroscope (26) for measuring the spatial orientation of the input interface (12) when the user (42) touches the input interface (12),
  an accelerometer (28) for measuring the movement of the input interface (12) when the user (42) touches the input interface (12),
  a timing unit (30) for measuring the duration of touch and/or the average time between touches when the user (42) touches the input interface (12), and
  a distance measuring unit to measure the distance when the user (42) touches the input interface (12).

4. The method according to claim 1, further comprising the step of generating the typing input by normal interaction of the users (42) with the computerized system (10).

5. The method according to claim 1, further comprising, in the case of identification of the un-identified user (42) as a non-authorized user, generating a message that the computerized system (10) is accessed by a non-authorized user.

6. The method according to claim 1, further comprising the step of permitting the user (42) to choose between a number of input interfaces (12) and wherein in the typing pattern contains information on the input interface (12) used to generate the typing input.

7. The method according to claim 1, further comprising the step of using the input manager (16) to monitor and collect the pressure with which the user (42) touches the input interface (12) to generate the typing input.

8. The method according to claim 1, further comprising the step of measuring the spatial orientation of the input interface (12) when the user (42) touches the input interface (12) to generate the typing input.

9. The method according to claim 1, further comprising the step of measuring the movement of the input interface (12) when the user (42) touches the input interface (12) to generate the typing input.

10. The method according to claim 1, further comprising the step of measuring the duration of touch and/or the average time between touches when the user (42) touches the input interface (12) to generate the typing input.

11. The method according to claim 1, further comprising the step of determining a user's touch position when the user (42) touches the input interface (12) to generate the typing input.

12. The method according to claim 1, further comprising the step of detecting the user (42) and/or the surroundings of the user (42) when the user (42) touches the input interface (12) to generate the typing input.

* * * * *